Sept. 16, 1952   E. F. SPENCER   2,610,600
PORTABLE SAW WELDING CLAMP
Filed May 7, 1948
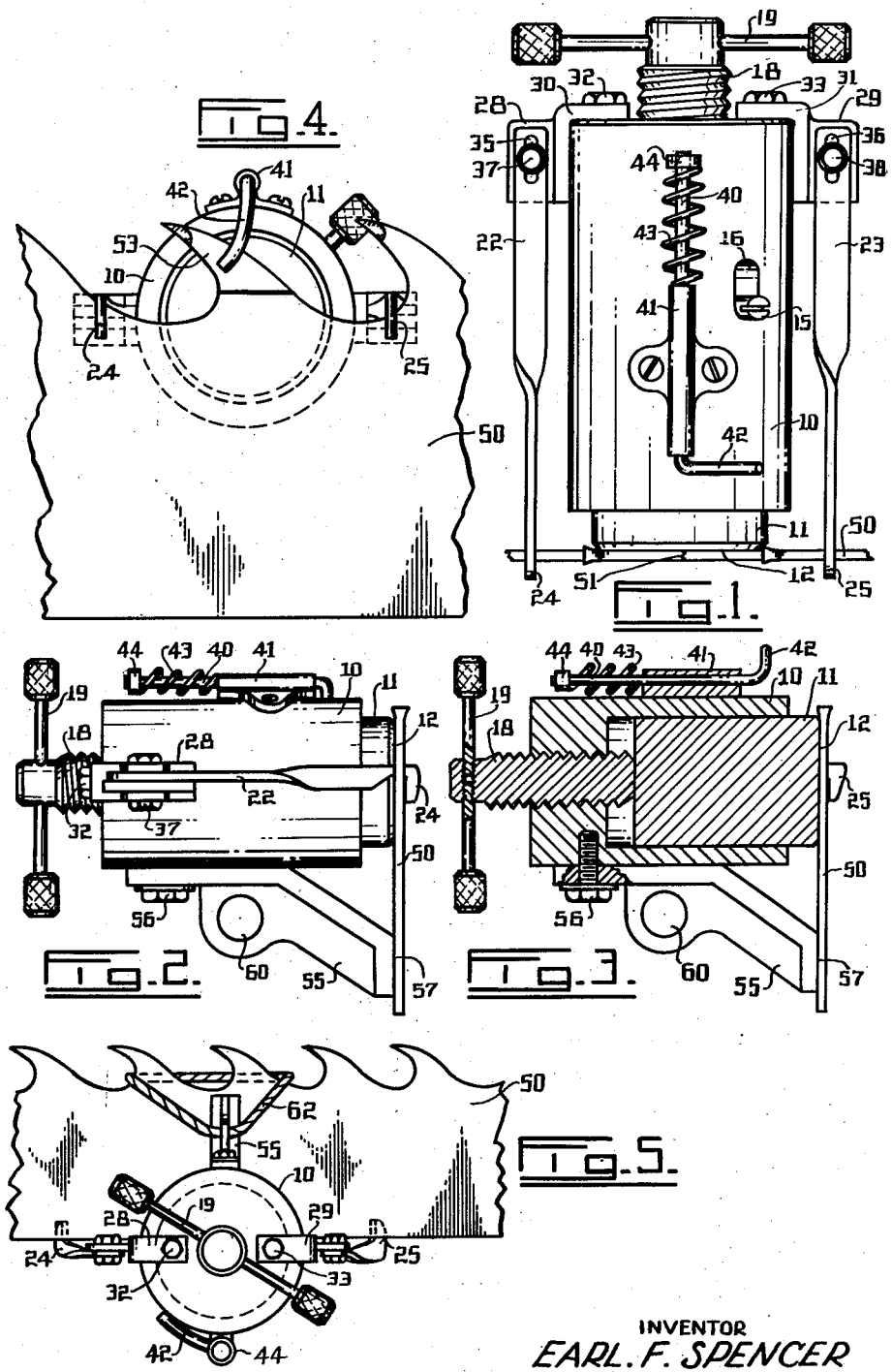
INVENTOR
EARL. F. SPENCER
BY
Fetherstonhaugh & Co.
ATTORNEYS Patented Sept. 16, 1952

2,610,600

UNITED STATES PATENT OFFICE 2,610,600

PORTABLE SAW WELDING CLAMP

Earl F. Spencer, Vancouver, British Columbia, Canada

Application May 7, 1948, Serial No. 25,551

1 Claim. (Cl. 113—99)

This invention relates to a portable clamp particularly for welding saw blades, but which may be used for other purposes as well.

An object of the present invention is the provision of a portable saw welding clamp which may be used to hold a saw blade in position while a crack therein is being welded.

A further object is the provision of a clamp for holding a tooth in place in relation to a saw blade while it is being welded thereto.

This clamp consists of a suitable support having an anvil slidably mounted therein. Clamping means carried by the support may hook over an edge of a saw blade to hold the clamp in position. Suitable means is provided for moving the anvil out of the support to press the end thereof against the blade hooked by the clamping means. If the clamp is to be used in connection with welding a crack in the blade, it is so located that the anvil extends on both sides of the crack so that it properly lines up the metal for welding. The clamping means is adjustable so that the device may be secured to saws of different types and it may be accurately positioned in relation to a crack therein. A holder may be resiliently mounted on the support for retaining a tooth to be welded on to a saw blade in the proper position in relation thereto for the welding operation.

Other objects and features of the invention will appear from the accompanying description with reference to the drawings, in which:

Figure 1 is a plan view of the clamp in position on a saw blade with a crack in the toothed edge thereof.

Figure 2 is a side elevation of the device in this position,

Figure 3 is a longitudinal section through the device,

Figure 4 is an end view of the device holding a tooth in position to be welded on to a saw blade, and Figure 5 illustrates the use of the clamp on the straight edge of a saw blade.

Referring more particularly to the drawings, 10 is a suitable support for an anvil 11 slidably mounted therein. In this form of the invention, the support is in the form of an open-ended housing, and the anvil is in the form of a relatively large plunger adapted to be moved out of the open end of the housing. The anvil is formed with a flat outer face 12. A pin 15 may project outwardly from the side of the anvil through an elongated slot 16 formed in the support housing 10. This slot extends longitudinally of the housing and limits the amount of travel of the anvil.

Suitable means is provided for moving the anvil out of the housing. One way of accomplishing this is by means of a screw shaft 18 threaded through the outer end of the housing and bearing against the inner end of the anvil. This shaft may be provided with a turning handle 19 at its outer end. When the shaft is rotated in one direction, the anvil is pressed out of the housing, and when it is rotated in the opposite direction the anvil is free to move back into the housing. If desired, the shaft 18 may be rotatably connected to the anvil to draw it back into the housing.

Suitable clamping means is provided for hooking over an edge of a saw blade in order to hold the latter against the outer face of the anvil as it is moved out of the housing. This clamping means is preferably in the form of arms 22 and 23 hingedly mounted on opposite sides of the housing and having hooks 24 and 25, respectively, formed at their outer ends. These arms are preferably hingedly and adjustably connected at their inner ends to the housing. To this end, brackets 28 and 29 are provided with laterally projecting lugs 30 and 31 which are pivotally connected to the end of the housing 10 by bolts 32 and 33. The arms 22 and 23 are provided with elongated slots 35 and 36 adjacent their inner ends through which bolts 37 and 38 from the brackets 28 and 29 extend. When the bolts 37 and 38 are loosened, the outer ends of the clamping arms 22 and 23 may be moved outwardly or inwardly, or they may be moved towards or away from the housing. Similarly, when the bolts 32 and 33 are loosened the brackets 28 and 29 may be pivoted around said bolts further to adjust the position of the outer ends or hooks of the arms in relation to the housing and anvil.

If desired, a holder 40 may be resiliently mounted on the support 10. This holder may extend freely through a sleeve 41 which is secured to the side of the support housing and extends longitudinally thereof. A finger 42 is formed on one end of the holder 40 and extends outwardly substantially at right angles thereto. A spring 43 is mounted on the holder and lies between the end of the sleeve 41 and a washer 44 fixed to the adjacent end of the holder. This spring normally holds the holder and its finger in the inoperative position shown in Figure 1.

In the drawings, 50 represents a saw blade, and in Figure 1, this blade has a crack 51 extending from the toothed edge thereof towards its center.

In Figure 4, one of the teeth of the saw blade has been broken off or removed, and a new tooth 53 is to be welded in the place of the old one. As this device is particularly designed for use with relatively large band saws, the saw blade is usually standing on edge with its teeth at the top, as clearly shown in Figure 4. In this case, the welding clamp lies in a horizontal position when in use, and therefore, a suitable brace 55 may be provided which is connected to a side of the housing 10 by a bolt 56 and projects outwardly from said housing at an angle, and is formed at this outer end with a flat bearing surface 57 which lies parallel with the outer end of the housing but spaced outwardly a little beyond said end. This brace may have a hole 60 formed therein.

In use, the anvil 11 is positioned within the support housing. Then the bolts 37 and 38 are loosened and the clamping arms 22 and 23 moved into positions where their hooks 24 and 25 may engage the saw blade between the teeth thereof, see Figure 4. After the bolts are tightened, the handle 19 may be turned to urge the anvil outwardly until its outer end bears against the saw blade. In Figure 1, the device is positioned so that the anvil overlaps the crack 51. As the anvil is moved outwardly, the blade, which is hooked by the clamping means, is pressed against the hooks 24 and 25 until the metal on the opposite sides of the crack is lined up for welding. At this time, the brace 55 bears against the saw blade to help keep the device in position. It is now a very simple matter to weld the crack in the usual manner.

When it is desired to weld a tooth 53 on to the blade, the clamping device is applied to the blade as described above. In this case, however, the anvil overlaps the point where the new tooth is to be welded. After the device has been clamped in position, the holder 40 is pulled towards the saw blade until its finger 42 can be rotated to overlap the outer end of the anvil. Then the tooth is moved into position for welding, and when the holder is released, the spring 43 moves the overlapped finger towards the anvil to clamp the tooth thereagainst in position for welding. As the end of the anvil is flat and overlaps both the saw blade and tooth, the surfaces thereof are in line, and the tooth may be welded in position in the usual manner. It may be necessary first to spot weld the tooth in place, and then remove the finger 42 to its inoperative position, before the welding operation is completed.

It is not practical to turn large band saws over when there is a crack in the back or straight edge thereof. Figure 4 illustrates the use of the device when a crack appears at the straight edge. A bridle 62 formed of wire, chain or other suitable material is threaded through the hole 60 of the brace 55 and then looped over two or more teeth to hold the clamp in position. The hooks 24 and 25 are placed over the saw edge and the clamp is operated in the same manner as described above.

What I claim as my invention is:

A portable saw welding clamp comprising a housing open at one end and closed at its opposite end, a heavy plunger anvil slidably mounted in the housing and projecting outwardly from one end thereof, said plunger anvil having a flat outer face lying substantially at right angles to the axis thereof, brackets at opposite sides of the housing, each bracket having a lug overlapping and pivotally connected to the closed end of the housing, a clamping arm for each bracket, each arm having a longitudinal slot adjacent one end, a bolt extending through each bracket and the slot of an arm for adjustably and hingedly connecting said arm to the bracket, said arms extending beyond the end of the housing from which the plunger anvil projects, hooks on the free ends of the arms, said hooks extending in the same direction substantially parallel to each other and being adapted to fit over an edge of a saw blade resting flat against the outer face of the plunger anvil, and means for moving the plunger anvil against a blade held by the hooks.

EARL F. SPENCER.

REFERENCES CITED

The following references are of record in the file of this patent:

UNITED STATES PATENTS

| Number | Name | Date |
|---|---|---|
| 251,950 | Robinson | Jan. 3, 1882 |
| 429,019 | Disston | May 27, 1890 |
| 625,007 | Wollman | May 16, 1899 |
| 680,304 | Wightman | Aug. 13, 1901 |
| 979,305 | Hunt | Dec. 20, 1910 |
| 1,145,199 | Kobert | July 6, 1915 |
| 1,767,935 | McDaniel | June 24, 1930 |
| 1,915,847 | Brant | June 27, 1933 |
| 1,930,642 | Clark | Oct. 17, 1933 |
| 2,186,641 | Jones | Jan. 9, 1940 |
| 2,256,554 | Epstein | Sept. 23, 1941 |
| 2,276,782 | Jones | Mar. 17, 1942 |
| 2,337,383 | Franz | Dec. 21, 1943 |
| 2,352,697 | Dittrich | July 4, 1944 |
| 2,452,985 | Bourdette | Nov. 2, 1948 |